(12) United States Patent
Ikeuchi

(10) Patent No.: US 11,927,200 B2
(45) Date of Patent: Mar. 12, 2024

(54) ROTARY MACHINE

(71) Applicant: MITSUBISHI HEAVY INDUSTRIES, LTD., Tokyo (JP)

(72) Inventor: Nanoha Ikeuchi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/067,842

(22) Filed: Dec. 19, 2022

(65) Prior Publication Data

US 2023/0296115 A1    Sep. 21, 2023

(30) Foreign Application Priority Data

Dec. 22, 2021  (JP) .................... 2021-208496

(51) Int. Cl.
*F01D 25/06* (2006.01)
*F02C 7/00* (2006.01)
*F04D 29/66* (2006.01)

(52) U.S. Cl.
CPC ........... *F04D 29/668* (2013.01); *F01D 25/06* (2013.01); *F02C 7/00* (2013.01); *F05D 2260/96* (2013.01)

(58) Field of Classification Search
CPC .. F04D 29/668; F04D 29/322; F04D 29/1902; F01D 25/06; F01D 5/00; F01D 5/027; F01D 5/22; F01D 5/225; F01D 5/26; F01D 5/3007; F02C 7/00; F05D 2260/96; F05D 2240/80; F05D 2300/431
See application file for complete search history.

(56) References Cited

U.S. PATENT DOCUMENTS

| 1,856,786 A | * | 5/1932 | Rice | F01D 5/10 416/500 |
| 4,872,812 A | * | 10/1989 | Hendley | F01D 11/006 416/193 A |
| 5,156,528 A | * | 10/1992 | Bobo | F01D 5/22 416/193 A |
| 5,261,790 A | * | 11/1993 | Dietz | F01D 5/22 416/193 A |

(Continued)

FOREIGN PATENT DOCUMENTS

| JP | 2011-530038 A | 12/2011 |
| JP | 2016-217349 A | 12/2016 |

*Primary Examiner* — David E Sosnowski
*Assistant Examiner* — Wayne A Lambert

(57) ABSTRACT

A rotary machine includes a rotary shaft that rotates around an axis, a plurality of rotor blades arranged on an outer peripheral side of the rotary shaft in a circumferential direction in which the rotor blade has a blade root, a platform, and a blade main body; and each damper member provided radially inward of the platform, in which the platform includes a first end surface that faces one side in the circumferential direction, and a second end surface that faces the other side in the circumferential direction so that the second end surface faces the first end surface of the adjacent other platform, and the damper member includes a first damper provided on the first end surface and having a first abutting surface, a second damper that has a second abutting surface slidably abutting the first abutting surface of the first damper and is abuttable on the second end surface, and an elastic member that bonds together the first damper and the second damper.

7 Claims, 5 Drawing Sheets

(56) References Cited

U.S. PATENT DOCUMENTS

| | | | | |
|---|---|---|---|---|
| 5,827,047 | A * | 10/1998 | Gonsor | F01D 11/008 416/193 A |
| 5,924,699 | A * | 7/1999 | Airey | F01D 11/006 277/411 |
| 6,478,544 | B2 * | 11/2002 | Brandl | F01D 5/22 416/193 A |
| 8,167,563 | B2 * | 5/2012 | Kayser | F01D 5/22 416/193 A |
| 8,672,626 | B2 * | 3/2014 | Boy | F01D 11/006 416/500 |
| 9,863,257 | B2 * | 1/2018 | Snyder | B33Y 80/00 |
| 9,995,162 | B2 * | 6/2018 | Snyder | F01D 5/22 |
| 10,472,975 | B2 * | 11/2019 | Kareff | F01D 5/22 |
| 10,801,335 | B2 * | 10/2020 | Umehara | F01D 5/22 |
| 2004/0000050 | A1 * | 1/2004 | Smith | B23P 6/007 29/889.2 |
| 2011/0206530 | A1 | 8/2011 | Fabre et al. | |
| 2013/0276456 | A1 * | 10/2013 | Propheter-Hinckley | F01D 5/22 29/889 |
| 2016/0333704 | A1 | 11/2016 | Annaluri et al. | |
| 2021/0148234 | A1 * | 5/2021 | Ikeuchi | F01D 5/26 |
| 2021/0172326 | A1 * | 6/2021 | Wondrasek | F01D 5/22 |

\* cited by examiner

ROTARY MACHINE

BACKGROUND OF THE INVENTION

Field of the Invention

The present disclosure relates to a rotary machine.

The present application claims Priority claimed on Japanese Patent Application No. 2021-208496, filed Dec. 22, 2021, the content of which is incorporated herein by reference.

Description of Related Art

In rotary machines such as gas turbines and jet engines, dampers are provided between adjacent turbine rotor blades. The dampers contact the turbine rotor blades as the rotary machine rotates. When vibration is generated due to an excitation force acting on the turbine rotor blades, the vibration is damped by a frictional force at the contact points between the dampers and the turbine rotor blades. For example, Japanese Unexamined Patent Application, First Publication No. 2016-217349 discloses a rotary machine having cylindrical damper pins that contact both platforms of adjacent turbine rotor blades.

SUMMARY OF THE INVENTION

However, the damper pin as described above wears out with long-term use. As the wear progresses, the cross-sectional shape of the damper pin becomes polygonal, and there is a possibility that damping characteristics of vibration by the damper pin cannot be obtained normally. As a result, the vibration is not damped and affects the operation of the rotary machine.

The present disclosure has been made to solve the above problems, and an object thereof is to provide a rotary machine with further reduced vibration.

In order to solve the above problems, an aspect of a rotary machine according to the present disclosure includes: a rotary shaft that rotates around an axis; a plurality of rotor blades arranged on an outer peripheral side of the rotary shaft in a circumferential direction in which the rotor blade has a blade root attached to the rotary shaft, a platform provided radially outward of the blade root, and a blade main body extending radially outward from the platform; and each damper member provided radially inward of the platform between the rotor blades adjacent to each other, in which the platform includes a first end surface that faces one side in the circumferential direction and radially expands, and a second end surface that faces the other side in the circumferential direction so that the second end surface faces the first end surface of the adjacent other platform and extends toward the other side in the circumferential direction while facing radially outward, and the damper member includes a first damper provided on the first end surface and having a first abutting surface, a second damper that has a second abutting surface slidably abutting the first abutting surface of the first damper and is abuttable on the second end surface, and an elastic member that bonds together the first damper and the second damper.

According to the present disclosure, it is possible to provide a rotary machine with further reduced vibration.

DETAILED DESCRIPTION OF THE INVENTION

First Embodiment

Configuration of Gas Turbine

A gas turbine 1 (rotary machine) according to a first embodiment of the present disclosure will be described below with reference to FIG. 1 to FIG. 4.

Figure 1:
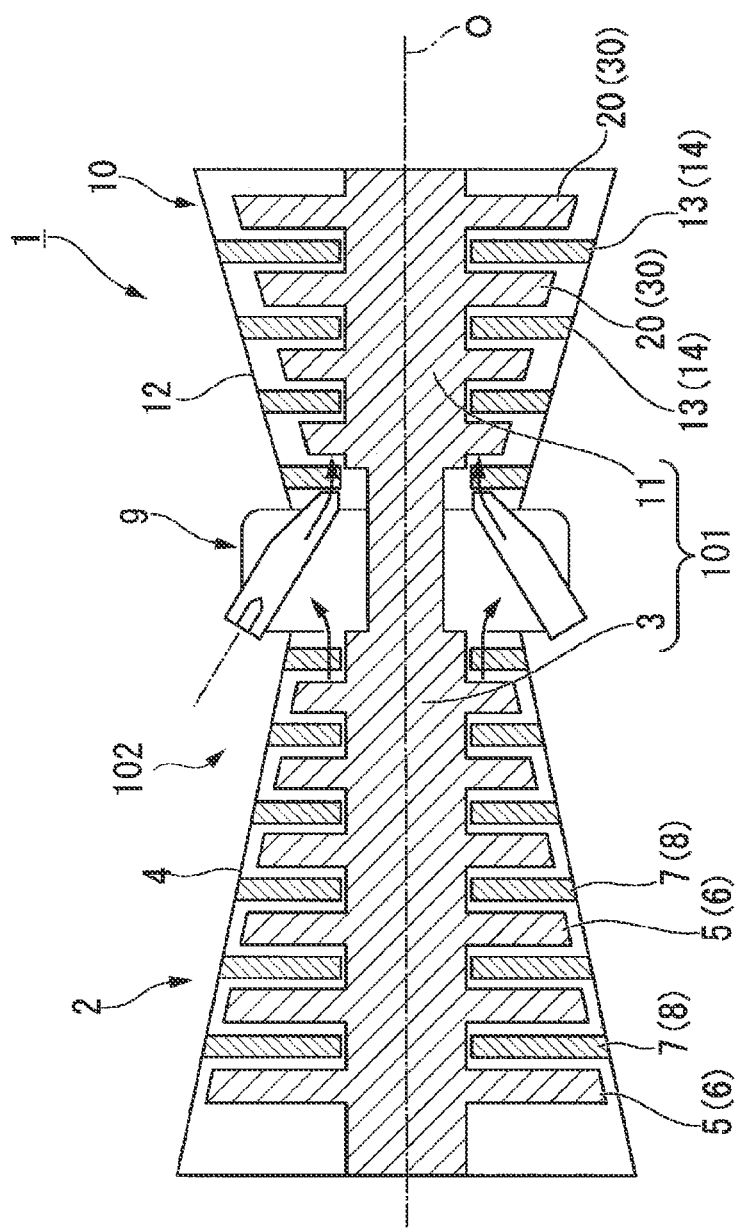
FIG. 1 is a schematic cross-sectional view showing a configuration of a gas turbine according to a first embodiment of the present disclosure.

As shown in FIG. 1, the gas turbine 1 according to the present embodiment includes a compressor 2 that generates compressed air, a combustor 9 that generates a combustion gas by mixing fuel with the compressed air and burning it, a turbine 10 driven by the combustion gas.

The compressor 2 has a compressor rotor 3 that rotates around an axis O, and a compressor casing 4 that covers the compressor rotor 3 from the outer peripheral side. The compressor rotor 3 has a columnar shape extending along the axis O. A plurality of compressor rotor blade rows 5 arranged with spaces therebetween in an axis O direction are provided on an outer peripheral surface of the compressor rotor 3. Each compressor rotor blade row 5 has a plurality of compressor rotor blades 6 arranged with spaces therebetween in the circumferential direction of the axis O on the outer peripheral surface of the compressor rotor 3.

The compressor casing 4 has a tubular shape centered on the axis O. A plurality of compressor stator blade rows 7 arranged with spaces therebetween in the axis O direction are provided on an inner peripheral surface of the compressor casing 4. These compressor stator blade rows 7 are alternately arranged with respect to the compressor rotor blade rows 5 when viewed from the axis O direction. Each compressor stator blade row 7 has a plurality of compressor stator blades 8 arranged with spaces therebetween in the circumferential direction of the axis O on the inner peripheral surface of the compressor casing 4.

The combustor 9 is provided between the compressor casing 4 and a turbine casing 12 which will be described later. Compressed air generated by the compressor 2 is mixed with fuel inside the combustor 9 to form a premixed gas. The premixed gas is combusted in the combustor 9 to generate a high-temperature and high-pressure combustion gas. The combustion gas is guided into the turbine casing 12 to drive the turbine 10.

The turbine 10 has a turbine rotor 11 (rotary shaft) that rotates around the axis O, a turbine casing 12 that covers the turbine rotor 11 from the outer peripheral side, and a damper member 50 (described later). The turbine rotor 11 has a columnar shape extending along the axis O. A plurality of turbine rotor blade rows 20 arranged with spaces therebetween in the axis O direction are provided on the outer peripheral surface of the turbine rotor 11. Each turbine rotor blade row 20 has a plurality of turbine rotor blades 30 arranged with spaces therebetween in the circumferential direction of the axis O on the outer peripheral surface of the turbine rotor 11. The turbine rotor 11 forms a gas turbine rotor 101 by being integrally connected to the compressor rotor 3 in the axis O direction.

The turbine casing 12 has a tubular shape centered on the axis O. A plurality of turbine stator blade rows 13 arranged with spaces therebetween in the axis O direction are provided on the inner peripheral surface of the turbine casing 12. These turbine stator blade rows 13 are alternately arranged with respect to the turbine rotor blade rows 20 when viewed from the axis O direction. Each turbine stator blade row 13 has a plurality of turbine stator blades 14 arranged with spaces therebetween in the circumferential direction of the axis O on the inner peripheral surface of the turbine casing 12. The turbine casing 12 forms a gas turbine casing 102 by being connected to the compressor casing 4 described above in the axis O direction. That is, the gas turbine rotor 101 described above is integrally rotatable around the axis O in the gas turbine casing 102.

Configuration of Turbine Rotor Blade

Figure 2:
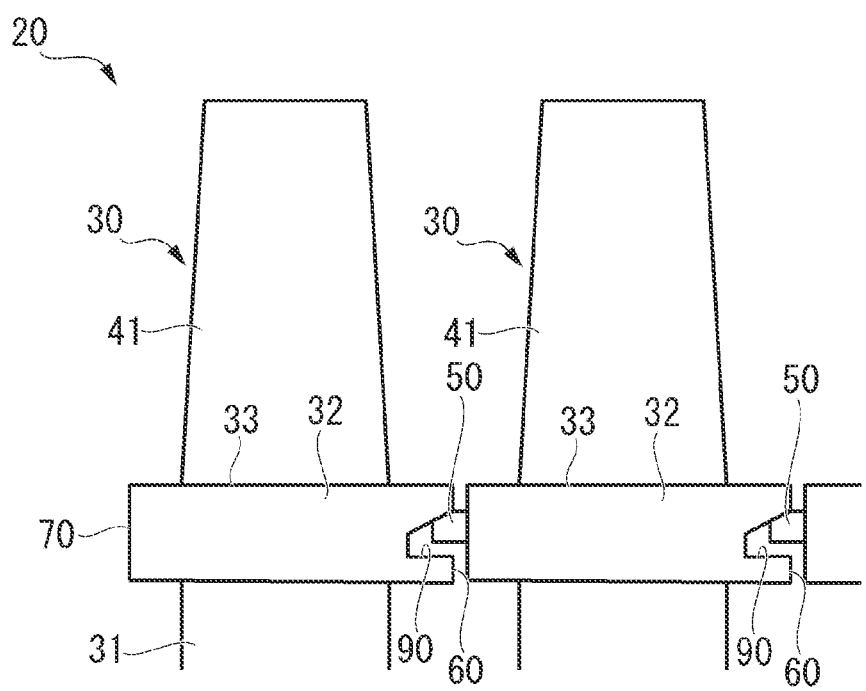
FIG. 2 is a schematic diagram of a rotor blade according to the first embodiment of the present disclosure as seen from an axial direction.

Next, the turbine rotor blade 30 will be described in more detail with reference to FIG. 2. The turbine rotor blade 30 has a blade root 31, a platform 32 and a blade main body 41. The blade root 31 is a portion of the turbine rotor blade 30 that is attached to the turbine rotor 11. The turbine rotor 11 is configured by laminating a plurality of discoid disks centered on the axis O in the axis O direction. The blade root 31 is integrally attached to the disk by fitting into a recessed groove (not shown) formed on the outer peripheral surface of the disk from the axis O direction. Thereby, the turbine rotor blades 30 are radially arranged to be spaced with respect to the disk in the circumferential direction.

The platform 32 is integrally provided radially outward of the blade root 31. The platform 32 protrudes from the radially outer end portion of the blade root 31 to the axis O direction and the circumferential direction. The outer peripheral surface 33 facing radially outward of the platform 32 is exposed to the combustion gas passing through the turbine 10.

A surface of the platform 32 facing one side in the circumferential direction is regarded as a first side surface 70 (first end surface). A surface of the platform 32 facing the other side in the circumferential direction is regarded as a second side surface 60. In the platforms 32 adjacent to each other, the first side surface 70 of one platform 32 faces the second side surface 60 of the other platform 32 with a space therebetween in the circumferential direction. The second side surface 60 is formed with a recessed portion 90 that is recessed toward one side in the circumferential direction. A damper member 50 is accommodated between the recessed portion 90 and the first side surface 70 which faces the recessed portion 90.

Configuration of Damper Member

Figure 3:
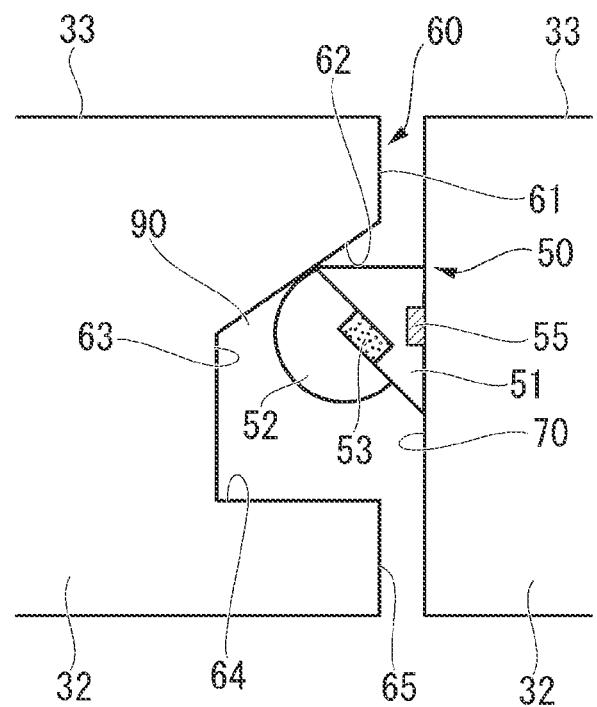
FIG. 3 is an enlarged cross-sectional view of a main part of a platform according to the first embodiment of the present disclosure.

Next, the damper member 50 and a peripheral configuration thereof will be described in detail with reference to FIG. 3. As shown in the figure, the first side surface 70 of the platform 32 expands in the radial direction and the axis O direction. The second side surface 60 has an outer peripheral end surface 61, a second end surface 62, a bottom surface 63, a third end surface 64 and an inner peripheral end surface 65.

The outer peripheral end surface 61 extends radially inward from the edge of the outer peripheral surface 33. The outer peripheral end surface 61 faces the first side surface 70 with a space therebetween in the circumferential direction. The second end surface 62 extends radially inward from the radially inner edge of the outer peripheral end surface 61. More specifically, the second end surface 62 extends to incline toward one side in the circumferential direction while facing radially inward.

The bottom surface 63 extends radially inward from the radially inner edge of the second end surface 62. The third end surface 64 extends from the radially inner edge of the bottom surface 63 toward the other side in the circumferential direction. The recessed portion 90 described above is formed by the second end surface 62, the bottom surface 63 and the third end surface 64. The inner peripheral end surface 65 extends radially inward from the edge of the third end surface 64 on the other side in the circumferential direction. The inner peripheral end surface 65 faces the first side surface 70 with a space therebetween in the circumferential direction.

Figure 4:
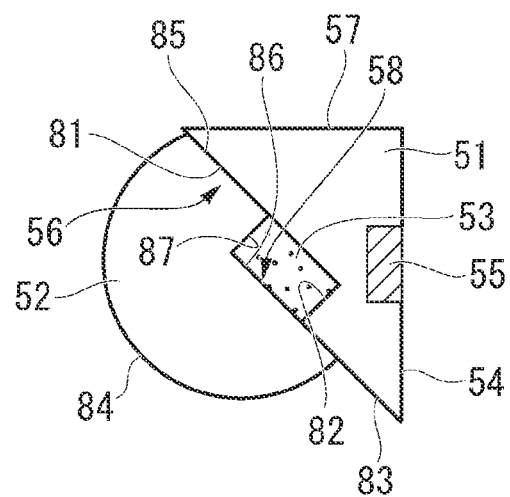
FIG. 4 is an enlarged cross-sectional view of a damper member according to the first embodiment of the present disclosure.

The damper member 50 has a first damper 51, a second damper 52, and an elastic member 53 that bonds together the first damper 51 and the second damper 52. The first damper 51 is detachably fixed to the first side surface 70. The first damper 51 has a triangular shape when viewed from the axis O direction. As shown in FIG. 4, the first damper 51 has a fixed surface 54, an outer surface 57, a magnet 55, and a first abutting surface 56.

A surface of the first damper 51 abutting the first side surface is regarded as a fixed surface 54. The magnet 55 is embedded in the fixed surface 54. The first damper 51 is detachably attached to the first side surface by the magnetic force of the magnet 55. It is desirable that the magnetic force of the magnet 55 is such that the first damper 51 is fixed on the first side surface 70 so as not to be relatively displaceable.

The outer surface 57 is a surface facing radially outward. The first abutting surface 56 connects the radially inner edge of the fixed surface 54 and the edge of the outer surface 57 on one side in the circumferential direction.

The first abutting surface 56 has a first region 81, a second region 83 and a pressure receiving region 82. The first region 81 is positioned on one side in the circumferential direction of the first abutting surface 56. The first region 81 extends radially inward while facing from one side toward the other side in the circumferential direction. The second region 83 extends in the same direction as the first region 81 extends and is positioned on the other side in the circumferential direction of the first region 81. The second region 83 is provided radially inward from the first region 81. That is, a level difference is formed between the second region 83 and the first region 81. This level difference is regarded as a pressure receiving region 82. The pressure receiving region 82 extends in a direction crossing the first region 81 and the second region 83.

The second damper 52 has a second abutting surface 58 slidably abutting the first abutting surface 56 of the first damper 51 and an arc surface 84 that can be abutted the second end surface 62. The second abutting surface 58 has a third region 85, a fourth region 86, and a pressurizing region 87. The third region 85 is positioned on one side in the circumferential direction of the second abutting surface 58. The third region 85 abuts (is in surface contact with) the first region 81 described above. The fourth region 86 extends in the same direction as the third region 85 extends and is positioned on the other side in the circumferential direction of the third region 85. The fourth region 86 abuts (is in surface contact with) the second region 83 described above. The fourth region 86 is provided radially inward from the third region 85. In other words, a level difference is formed between the fourth region 86 and the third region 85. This level difference is regarded as a pressurizing region 87. The pressurizing region 87 extends in a direction crossing the third region 85 and the fourth region 86.

A space having a rectangular cross section is formed by the four surfaces of the first region 81, the pressure receiving region 82, the pressurizing region 87, and the fourth region 86. This space is filled with elastic members 53. A resin material including hard rubber is preferably used as the elastic member 53. In other words, this elastic member 53 has higher elasticity and viscosity than the material forming the first damper 51 and the second damper 52. In addition, the elastic member 53 also has an adhesive force for bonding the first damper 51 and the second damper 52.

The arc surface 84 joins the radially outer edge of the third region 85 and the radially inner edge of the fourth region 86. The arc surface 84 has an arc shape to be convex toward one side in the circumferential direction and radially inward. This arc surface 84 can abut the second end surface 62.

Operational Effects

Next, the operation of the damper member 50 will be described with reference to FIG. 3 or FIG. 4. When the gas turbine 1 is operated, vibration in the circumferential direction may be caused in the turbine rotor blade 30. In other words, the turbine rotor blade 30 may vibrate to fall from one side toward the other side in the circumferential direction. The damper member 50 is provided to absorb and damp such vibration.

When the turbine rotor blade 30 is displaced in the circumferential direction, the platform 32 is also displaced in the circumferential direction. Then, the second end surface 62 of the recessed portion 90 abuts the second damper 52 of the damper member 50. Specifically, the second end surface 62 presses the arc surface 84 of the second damper 52. Thereby, the second damper 52 slides against the first damper 51.

As the second damper 52 slides, a frictional force due to sliding is generated between the third region 85 and the first region 81 and between the fourth region 86 and the second region 83. That is, the energy of vibration generated in the platform 32 is converted into thermal energy (frictional heat) due to friction. As a result, the vibration can be damped. Therefore, it is possible to operate the gas turbine 1 stably.

Furthermore, the elastic member 53 is provided between the first damper 51 and the second damper 52. When the second damper 52 slides, the elastic member 53 is elastically deformed so as to be crushed between the pressurizing region 87 and the pressure receiving region 82. As this elastic deformation is caused, some of the energy of vibration of the platform 32 is absorbed. Therefore, together with the above-described vibration damping effect due to friction, the vibration can be damped more effectively.

Furthermore, according to the above configuration, the first abutting surface 56 and the second abutting surface 58 extend radially inward while facing from one side toward the other side in the circumferential direction. That is, these surfaces extend in the direction along the displacement of the second end surface 62 due to the vibration. As a result, when the second end surface 62 is displaced, the force generated by the displacement can be efficiently converted into sliding between the first abutting surface 56 and the second abutting surface 58. As a result, a sufficient frictional force can be generated between the first abutting surface 56 and the second abutting surface 58. Therefore, it is possible to obtain a sufficient vibration damping effect.

In addition, according to the above configuration, the first damper 51 is detachably fixed to the first side surface 70 by the magnet 55. As a result, the damper member 50 can be easily added to the existing turbine rotor blade 30 simply by attaching the magnet 55. Also, when the damper member 50 is worn out, the damper member 50 can be easily removed and replaced with a new damper member 50. As a result, it is possible to operate the gas turbine 1 more stably.

Further, according to the above configuration, the arc surface 84 is formed on the second damper 52. This arc surface 84 abuts the second end surface 62. Even when the amount of displacement due to the vibration of the turbine rotor blade changes, that is, even when an abutment angle or a posture of the second end surface 62 with respect to the arc surface 84 changes, the change in displacement can be absorbed corresponding to every abutment angle due to the arc surface 84 has an arc shape. As a result, it is possible to damp the vibration more effectively.

Other Embodiments

As described above, the embodiment of the present disclosure has been described in detail with reference to the drawings, but the specific configuration is not limited to the embodiment, and a design change and the like are included without departing from the concept of the present disclosure.

The embodiment described above describes the configuration in which the first damper 51 is fixed to the first side surface by the magnet 55. However, the first damper 51 may not necessarily be fixed by the magnet 55, but may be fixed to the platform 32 by welding or bolting.

Also, the elastic member 53 may be arranged at a position different from the above configuration as long as the first damper 51 and the second damper 52 can be bond.

Second Embodiment

Next, a second embodiment of the present disclosure will be described with reference to FIG. 5. In addition, the same configuration as that of the first embodiment is denoted by the same reference numbers, and a detailed description thereof is omitted.

Figure 5:
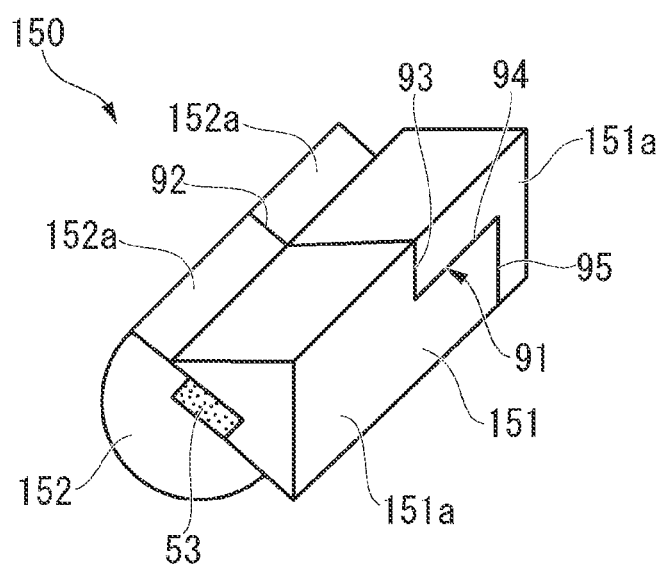
FIG. 5 is a perspective view of a damper member according to a second embodiment of the present disclosure.

As shown in FIG. 5, in the damper member 150 according to the present embodiment, a first damper 151 and a second damper 152 are divided into two along the axis O direction. Specifically, the first damper 151 has a plurality (a pair) of first damper divided bodies 151*a*, and the second damper 152 has a plurality (a pair) of second damper divided bodies 152*a*.

The first damper divided bodies 151*a* abut each other through a first divided surface 91 (divided surface) extending in the circumferential direction. The second damper divided bodies 152*a* abut each other through the second divided surface 92 (divided surface). When viewed from the circumferential direction, the first divided surface 91 includes a first radial surface 93 that extends in the radial direction and is positioned on the outer peripheral side, and an axial surface 94 that extends in the axis O direction from the edge on the inner peripheral side of the first radial surface 93, and a second radial surface 95 that extends radially inward from the edge of the axial surface 94. That is, when viewed from the circumferential direction, first divided surface 91 extends in a zigzag shape in the radial direction and the axis O direction.

Each of the first divided surface 91 and the second divided surface 92 described above refer to virtual surfaces formed between the first damper divided bodies 151a and between the second damper divided bodies 152a.

Operational Effects

In addition to the vibration in the circumferential direction described in the first embodiment, the turbine rotor blade 30 has a vibration mode such that the turbine rotor blade 30 itself is twisted in the axis O direction. In other words, the vibration mode is such that both ends of the turbine rotor blade 30 in a chord direction are displaced in directions away from each other. When such vibration is generated, in the damper member 150 according to the present embodiment, the first damper divided bodies 151a and the second damper divided bodies 152a are relatively displaced so as to slide each other on each of divided surfaces (the first divided surface 91 and the second divided surface 92).

In this case, the energy of vibration is converted into heat (frictional heat) due to friction between the first damper divided bodies 151a and between the second damper divided bodies 152a. As a result, the energy of vibration can be damped. That is, in addition to the vibration in the circumferential direction described in the first embodiment, a high damping effect can be exhibited for the torsional vibration as described above. As a result, it is possible to operate the gas turbine 1 still more stably.

Furthermore, the first divided surface 91 of the first damper 151 extends in a zigzag shape in the radial direction and the axis O direction as described above. Thereby, a larger contact area can be secured between the first damper divided bodies 151a than, for example, when the first divided surface 91 simply expands in the radial direction. As a result, it is possible to further increase the vibration damping effect due to the friction described above.

The second embodiment of the present disclosure has been described above. Various changes and modifications can be made to the above configurations without departing from the gist of the present disclosure.

Figure 6:
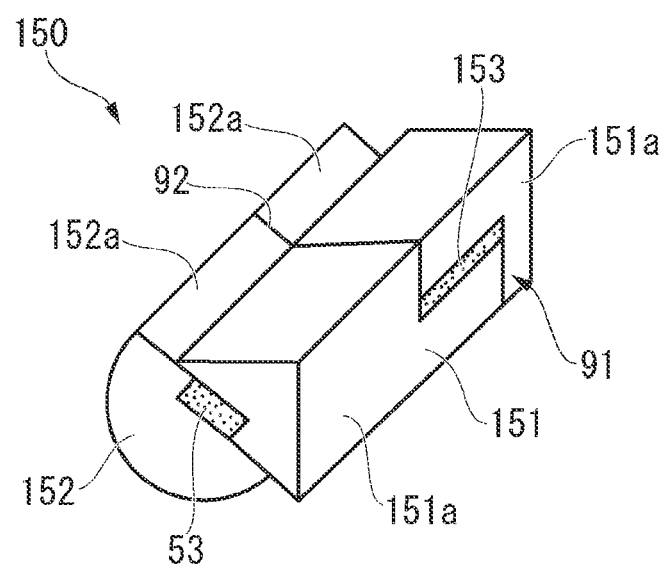
FIG. 6 is a perspective view showing a modified example of the damper member according to the second embodiment of the present disclosure.

For example, as shown as a modified example in FIG. 6, the second elastic member 153 can be further provided on the first divided surface 91. Specifically, an example in which the second elastic member 153 is provided between the axial surfaces 94 can be considered. As for the second elastic member 153, a resin material including hard rubber is preferably used as in the case of the elastic member 53. That is, the second elastic member 153 has higher elasticity and viscosity than the material forming the first damper 151 and the second damper 152. In addition, the second elastic member 153 also has an adhesive force for bonding the first damper divided bodies 151a.

According to this configuration, in addition to the vibration damping effect due to the friction between the first damper divided bodies 151a, an absorption effect of the energy of vibration due to the elastic deformation of the second elastic member 153 can be obtained. As a result, the vibration can be further reduced.

Other Embodiments

In addition to the above embodiments, it is possible to employ the following configurations. In the second embodiment described above, the first damper 151 has a pair of first damper divided bodies 151a, and the second damper 152 has a pair of second damper divided bodies 152a. However, the number of divisions of the first damper 151 and the second damper 152 is not limited to two, and may be three or more. That is, two or more of the first divided surfaces 91 and the second divided surfaces 92 may be formed. As the number of divisions increases in this manner, the first damper 151 and the second damper 152 can more flexibly follow the torsional vibration (deformation) of the turbine rotor blade 30 itself. As a result, the vibration can be damped more effectively.

Appendix

The rotary machine described in each embodiment is comprehended, for example, as follows.

A rotary machine (gas turbine 1) according to an first aspect includes: a rotary shaft (turbine rotor 11) that rotates around an axis O; a plurality of rotor blades (turbine rotor blades 30) arranged on an outer peripheral side of the rotary shaft in a circumferential direction in which the rotor blade has a blade root 31 attached to the rotary shaft, a platform 32 provided radially outward of the blade root 31, and a blade main body 41 extending radially outward from the platform 32; and each damper member 50 provided radially inward of the platform 32 between the rotor blades adjacent to each other, in which the platform 32 includes a first end surface (first side surface 70) that faces one side in the circumferential direction and radially expands, and a second end surface 62 that faces the other side in the circumferential direction so that the second end surface 62 faces the first end surface of the adjacent other platform 32 and extends toward the other side in the circumferential direction while facing radially outward, and the damper member 50 includes a first damper 51 provided on the first end surface and having a first abutting surface 56, a second damper 52 that has a second abutting surface 58 slidably abutting the first abutting surface 56 of the first damper 51 and is abuttable on the second end surface 62, and an elastic member 53 that bonds together the first damper 51 and the second damper 52.

According to the above configuration, the vibration of the rotor blade can be damped by the friction, and an elastic force of the elastic member 53 when the second damper 52 slides against the first damper 51.

A rotary machine according to a second aspect is the rotary machine according to the first aspect, in which the first abutting surface 56 and the second abutting surface 58 extend radially inward while facing from one side toward the other side in the circumferential direction.

According to the above configuration, when the vibration is caused in the rotor blade, a sufficient frictional force can be generated between the first abutting surface 56 and the second abutting surface 58.

A rotary machine according to a third aspect is the rotary machine according to the first aspect or the second aspect, in which the first abutting surface 56 includes a first region 81 positioned on one side in the circumferential direction, a second region 83 positioned on the other side in the circumferential direction with respect to the first region 81 and provided radially inward from the first region 81, and a pressure receiving region 82 that connects the first region 81 and the second region 83, the second abutting surface 58 includes a third region 85 positioned on one side in the circumferential direction, a fourth region 86 positioned on the other side in the circumferential direction with respect to the third region 85 and positioned radially inward from the third region, and a pressurizing region 87 that connects the third region 85 and the fourth region 86, and the elastic member 53 is disposed in a space formed by the first region 81, the pressure receiving region 82, the pressurizing region 87, and the fourth region 86.

According to the above configuration, the elastic member 53 is elastically deformed so as to be crushed between the pressurizing region 87 and the pressure receiving region 82, thereby the energy of vibration of the rotor blade can be effectively absorbed and damped.

A rotary machine according to a fourth aspect is the rotary machine according to any one of the first aspect to the third aspect, and further includes a magnet 55 that fixes the first damper 51 to the first end surface of the platform.

According to the above configuration, the damper member can be easily added to the existing rotor blade by the magnet 55.

A rotary machine according to a fifth aspect is the rotary machine according to any one aspect of the first aspect to the fourth aspect, in which a portion of the second damper 52 opposed to the second end surface has an arc-shaped cross-sectional shape.

According to the above configuration, even when the amount of displacement due to vibration of the rotor blade changes, the change in displacement can be absorbed by the arc surface 84.

A rotary machine according to a sixth aspect is the rotary machine according to any one aspect of the first aspect to the fifth aspect, in which the first damper 51 and the second damper 52 are divided in an axial direction and include a plurality of first damper divided bodies 151a and a plurality of second damper divided bodies 152a, each of which are slidable against each other through a divided surface.

According to the above configuration, even when the vibration such that the rotor blade is twisted in the axial direction is generated, the vibration can be absorbed and damped by sliding the first damper divided bodies 151a and the second damper divided bodies 152a on the divided surfaces.

A rotary machine according to a seventh aspect is the rotary machine according to the sixth aspect, and further includes a second elastic member 153 disposed between the first damper divided bodies 151a.

According to the above configuration, the energy of torsional vibration can be further absorbed and damped by the second elastic member 153.

While preferred embodiments of the invention have been described and illustrated above, it should be understood that these are exemplary examples of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

EXPLANATION OF REFERENCES

1 Gas turbine (rotary machine)
2 Compressor
3 Compressor rotor
4 Compressor casing
5 Compressor rotor blade row
6 Compressor rotor blade
7 Compressor stator blade row
8 Compressor stator blade
9 Combustor
10 Turbine
11 Turbine rotor
12 Turbine casing
13 Turbine stator blade row
14 Turbine stator blade
20 Turbine rotor blade row
30 Turbine rotor blade
31 Blade root
32 Platform
33 Outer peripheral surface
41 Blade main body
50 Damper member
51 First damper
52 Second damper
53 Elastic member
54 Fixed surface
55 Magnet
56 First abutting surface
57 Outer surface
58 Second abutting surface
60 Second side surface
61 Outer peripheral end surface
62 Second end surface
63 Bottom surface
64 Third end surface
65 Inner peripheral end surface
70 First side surface (first end surface)
81 First region
82 Pressure receiving region
83 Second region
84 Arc surface
85 Third region
86 Fourth region
87 Pressurizing region
90 Recessed portion
91 First divided surface
92 Second divided surface
93 First radial surface
94 Axial surface
95 Second radial surface
101 Gas turbine rotor
102 Gas turbine casing
150 Damper member
151 First damper
152 Second damper
151a First damper divided body
152a Second damper divided body
153 Second elastic member
O Axis

What is claimed is:
1. A rotary machine comprising:
a rotary shaft that rotates around an axis;
rotor blades disposed in a circumferential direction on an outer peripheral side of the rotary shaft, each of the rotor blades comprising:
a blade root attached to the rotary shaft;
a platform disposed radially outward of the blade root; and
a blade main body extending radially outward from the platform; and
damper members, each of which is disposed radially inward of the
platform between adjacent ones of the rotor blades, wherein the platform includes:
a first end surface that faces a first side in the circumferential direction and extends radially, and
a second end surface that faces a second side in the circumferential direction such that the second end surface faces the first end surface of an adjacent platform and extends toward the first side in the circumferential direction while extending radially outward, and each of the damper members comprises:
- a first damper disposed on the first end surface and having a first abutting surface,
- a second damper that has a second abutting surface slidably abutting the first abutting surface of the first damper and is abuttable on the second end surface, and
- an elastic member that bonds the first damper to the second damper.

2. The rotary machine according to claim 1, wherein the first abutting surface and the second abutting surface extend radially inward while extending from the first side toward the second side in the circumferential direction.

3. The rotary machine according to claim 1, wherein the first abutting surface includes:
- a first region on the first side in the circumferential direction,
- a second region on the second side in the circumferential direction with respect to the first region and radially inward from the first region, and
- a pressure receiving region that connects the first region to the second region, the second abutting surface includes:
- a third region on the first side in the circumferential direction,
- a fourth region on the second side in the circumferential direction with respect to the third region and radially inward from the third region, and
- a pressurizing region that connects the third region to the fourth region, and the elastic member is disposed in a space formed by the first region, the pressure receiving region, the pressurizing region, and the fourth region.

4. The rotary machine according to claim 1, wherein one of the damper members comprises a magnet that fixes the first damper to the first end surface of the platform on which the first damper is disposed.

5. The rotary machine according to claim 1, wherein a portion of the second damper opposed to the second end surface has an arc-shaped cross-sectional shape.

6. The rotary machine according to claim 1, wherein, in one of the damper members,
- the first damper is divided into two first damper divided bodies that are disposed in a direction of the axis and are slidable against each other through a first divided surface, and
- the second damper is divided into two second damper divided bodies that are disposed in the direction of the axis and are slidable against each other through a second divided surface.

7. The rotary machine according to claim 6, wherein the one of the damper members comprises another elastic member disposed between the two first damper divided bodies.

\* \* \* \* \*